United States Patent
Okada et al.

(10) Patent No.: US 10,406,581 B2
(45) Date of Patent: *Sep. 10, 2019

(54) METHOD FOR MANUFACTURING A WORKED MEMBER USING AN INDUCTION HEATING COIL

(71) Applicant: NIPPON STEEL & SUMITOMO METAL CORPORATION, Tokyo (JP)

(72) Inventors: Nobuhiro Okada, Tokyo (JP); Atsushi Tomizawa, Tokyo (JP); Naoaki Shimada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 471 days.

This patent is subject to a terminal disclaimer.

(21) Appl. No.: 15/140,527

(22) Filed: Apr. 28, 2016

(65) Prior Publication Data
US 2016/0279690 A1 Sep. 29, 2016

Related U.S. Application Data

(63) Continuation of application No. 13/542,883, filed on Jul. 6, 2012, now Pat. No. 9,604,272, which is a
(Continued)

(30) Foreign Application Priority Data
Jan. 6, 2010 (JP) .................................. 2010-001384

(51) Int. Cl.
*B21D 7/16* (2006.01)
*C21D 1/42* (2006.01)
(Continued)

(52) U.S. Cl.
CPC ............. *B21D 7/162* (2013.01); *B21D 7/165* (2013.01); *C21D 1/42* (2013.01); *C21D 9/08* (2013.01);
(Continued)

(58) Field of Classification Search
CPC ........ B21D 7/162; B21D 7/165; C21D 11/00; C21D 1/42; C21D 9/08; C21D 9/085;
(Continued)

(56) References Cited

U.S. PATENT DOCUMENTS 1,936,309 A * 11/1933 Northrup ............... H05B 6/367
219/606
3,229,489 A 1/1966 Huet
(Continued)

FOREIGN PATENT DOCUMENTS

EP 0 589 087 3/1994
JP 73010708 6/1973
(Continued)

OTHER PUBLICATIONS

Translation of JPH0280125.*
(Continued)

*Primary Examiner* — Ibrahime A Abraham
*Assistant Examiner* — Frederick F Calvetti
(74) *Attorney, Agent, or Firm* — Clark & Brody (57) ABSTRACT

An induction heating coil for stably heating a steel tube which is being fed in its axial direction without rotating, the heating being uniform in the circumferential direction and in a narrow range in the axial direction has at least two 1-turn coils in the form of a first turn coil body and a second turn coil body. The inner peripheral length Ln (the non-effective coil length) where the effective number of coil turns is less than the total number of coil turns when the coil is projected in the axial direction and the inner peripheral length L0 of the projected coil bodies (the inner coil length) satisfy Ln/L0<0.05. First and second coil bodies have insulating portions on their connecting portions, and the insulating portions are present in locations separated by a central angle of 5-45° measured from the center of the coil bodies.

1 Claim, 7 Drawing Sheets

Related U.S. Application Data continuation of application No. PCT/JP2011/050093, filed on Jan. 6, 2011.

(51) Int. Cl.
  *C21D 9/08* (2006.01)
  *C21D 11/00* (2006.01)
  *H05B 6/36* (2006.01)
  *H05B 6/10* (2006.01)
  *H05B 6/44* (2006.01)

(52) U.S. Cl.
  CPC .............. *C21D 9/085* (2013.01); *C21D 11/00* (2013.01); *H05B 6/104* (2013.01); *H05B 6/36* (2013.01); *H05B 6/44* (2013.01); *Y02P 10/253* (2015.11)

(58) Field of Classification Search
  CPC .. H05B 6/104; H05B 6/36; H05B 6/44; Y02P 10/253
  USPC ....... 219/900, 635, 536, 637, 639, 640, 642, 219/643, 645, 646, 647, 672, 673, 674, 219/50, 162, 81, 82
  See application file for complete search history.

(56) References Cited

U.S. PATENT DOCUMENTS

| | | | |
|---|---|---|---|
| 3,301,991 A * | 1/1967 | Springob | H05B 6/104 219/637 |
| 3,424,886 A | 1/1969 | Ross | |
| 3,472,987 A * | 10/1969 | Viart | B23K 13/02 219/610 |
| 3,603,760 A * | 9/1971 | Khrenov | B21D 26/14 219/617 |
| 3,688,233 A | 8/1972 | Moore | |
| 3,689,727 A * | 9/1972 | Morris | B23K 13/02 219/614 |
| 3,725,630 A * | 4/1973 | Gagliardi | H05B 6/362 156/274.2 |
| 3,755,644 A | 8/1973 | Lewis | |
| 3,956,916 A | 5/1976 | Herkner et al. | |
| 4,062,216 A | 12/1977 | Hanamoto et al. | |
| 4,098,106 A * | 7/1978 | Yamaguchi | B21D 7/025 72/128 |
| 4,173,461 A | 11/1979 | Ebata et al. | |
| 4,251,704 A * | 2/1981 | Masie | H05B 6/405 219/640 |
| 4,596,128 A * | 6/1986 | Ringersma | B21D 7/025 72/128 |
| 4,675,488 A * | 6/1987 | Mucha | C21D 9/32 219/640 |
| 4,749,834 A * | 6/1988 | Mucha | C21D 9/32 219/640 |
| 4,785,147 A * | 11/1988 | Mucha | C21D 9/32 219/640 |
| 4,786,772 A | 11/1988 | Umemoto et al. | |
| 4,808,779 A * | 2/1989 | Cogley | C21D 9/32 219/640 |
| 4,855,551 A * | 8/1989 | Mucha | C21D 9/32 219/640 |
| 5,304,767 A * | 4/1994 | McGaffigan | H05B 6/065 219/674 |
| 5,316,849 A | 5/1994 | Lu et al. | |
| 5,317,121 A * | 5/1994 | Katayama | H05B 6/36 219/672 |
| 5,495,094 A * | 2/1996 | Rowan | H05B 6/104 219/645 |
| 6,477,879 B1 | 11/2002 | Sawa | |
| 6,736,910 B2 | 5/2004 | Toyooka et al. | |
| 6,954,679 B1 | 10/2005 | Takeda et al. | |
| 7,104,100 B2 | 9/2006 | Saegusa | |
| 7,269,986 B2 | 9/2007 | Pfaffmann et al. | |
| 2003/0047558 A1* | 3/2003 | Niklaus | H05B 6/104 219/673 |
| 2005/0006120 A1* | 1/2005 | Lovens | H05B 6/104 174/352 |
| 2006/0151481 A1* | 7/2006 | Roehr | H05B 6/104 219/645 |
| 2007/0000916 A1* | 1/2007 | Tanaka | C21D 1/42 219/639 |
| 2008/0066517 A1* | 3/2008 | Tomizawa | B21D 7/08 72/364 |
| 2010/0108653 A1* | 5/2010 | Ota | B23K 26/0066 219/121.85 |
| 2010/0163551 A1* | 7/2010 | Minoue | H05B 6/101 219/652 |
| 2010/0218577 A1* | 9/2010 | Tomizawa | B21D 7/08 72/128 |
| 2011/0011750 A1* | 1/2011 | Lovens | H05B 6/34 205/771 |
| 2012/0167651 A1* | 7/2012 | Tomizawa | B21D 7/165 72/68 |

FOREIGN PATENT DOCUMENTS

| | | |
|---|---|---|
| JP | 02-080125 | 3/1990 |
| JP | 06-243960 | 9/1994 |
| JP | 10302956 | 11/1998 |
| JP | 2002-080125 | 3/2002 |
| JP | 2006-523364 | 10/2006 |
| WO | 01/69977 | 9/2001 |
| WO | 2005/004559 | 1/2005 |
| WO | 2006/093006 | 9/2006 |
| WO | 2007/141422 | 12/2007 |
| WO | 2008/136068 | 11/2008 |

OTHER PUBLICATIONS

Jidosha Gijutsu, Journal of Society of Automotive Engineers of Japan, vol. 57, No. 6 (2003), pp. 23-28.
Indian Office Action for Application No. 6264/DELNP/2012, dated Feb. 19, 2018, with English translation.

* cited by examiner

METHOD FOR MANUFACTURING A WORKED MEMBER USING AN INDUCTION HEATING COIL

This application is a Continuation of U.S. Ser. No. 13/542,883 filed on Jul. 6, 2012, which is a Continuation of PCT/JP2011/050093 filed on Jan. 6, 2011.

TECHNICAL FIELD

This invention relates to an induction heating coil and an apparatus and method for manufacturing a worked member. The present invention relates to an induction heating coil which is suitable for use when manufacturing a quenched steel material such as a quenched steel tube, an apparatus for manufacturing a worked member having this induction heating coil, and a method of manufacturing a worked member using this induction heating coil.

BACKGROUND ART

Strength members, reinforcing members, and structural members made of metal are used in automobiles and various types of machines A high strength, a low weight, and a small size are demanded of these members. In the past, these members have been manufactured by welding of press worked steel parts, punching of thick steel plates, forging of aluminum alloys, and similar methods. Reductions in weight and size achievable by these manufacturing methods are reaching a limit.

In order to further decrease their weight and size, these members are also manufactured by hydroforming as disclosed in Non-Patent Document 1, for example. Hydroforming manufactures a formed article having a complex shape by supplying a high pressure working fluid to the interior of a metal tube disposed inside dies to expand the metal tube and to deform the metal tube to conform to the inner surface of the dies. Since hydroforming is a type of cold working, it is difficult to use this method to form a material having low ductility such as one having a tensile strength of at least 780 MPa into a complicated shape. Hydroforming usually requires the three steps of bending, preforming, and hydroforming, thereby making the steps relatively complicated. Furthermore, the machinery used for hydroforming is large and relatively expensive.

Figure 6:
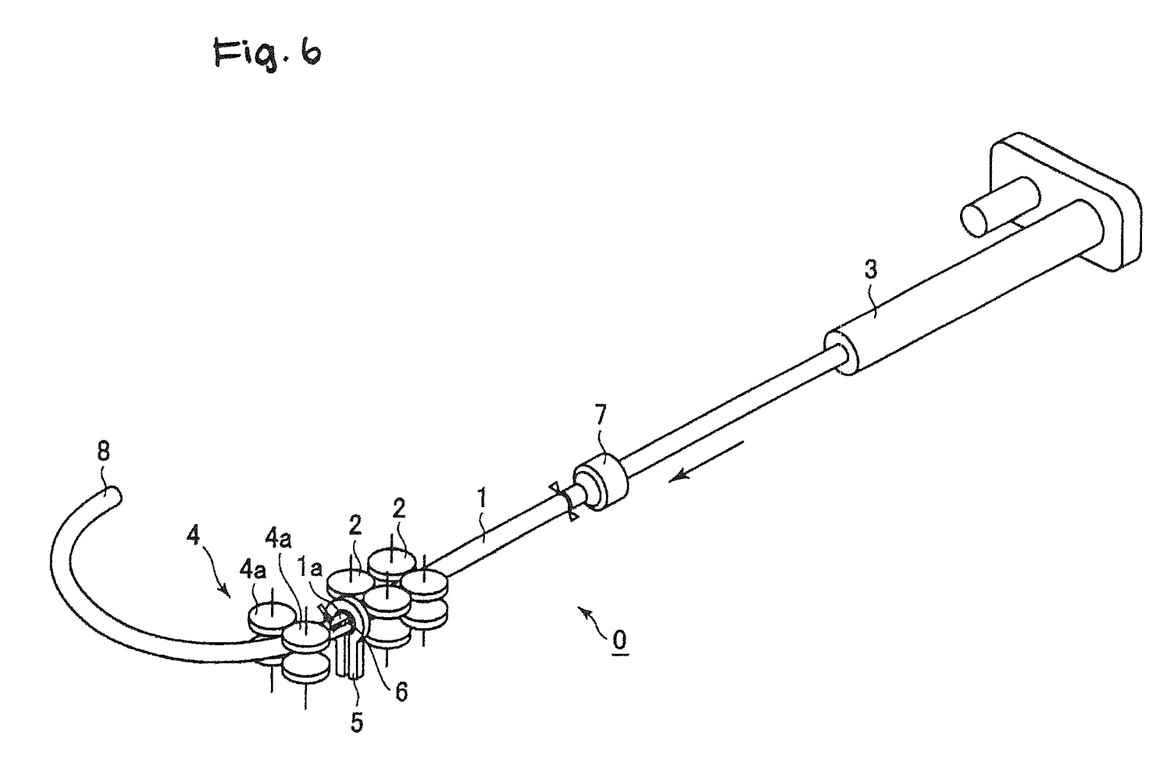
FIG. 6 is an explanatory view schematically showing a bending apparatus disclosed in Patent Document 1.

In Patent Document 1, the present applicant disclosed an apparatus for manufacturing a bent member. FIG. 6 is an explanatory view schematically showing that manufacturing apparatus 0.

A metal tube 1 (in the following explanation, an example will be given of the case in which the metal tube is a steel tube) is supported by a support mechanism 2 so as to be able to move in its axial direction. A feed mechanism 3 feeds the steel tube 1 from the upstream side to the downstream side. The manufacturing apparatus 0 manufactures a bent member 8 by carrying out bending of the steel tube 1 in a position downstream of the support mechanism 2.

Downstream of the support mechanism 2, an induction heating coil 5 locally performs rapid induction heating of the steel tube 1 being fed in its axial direction to a temperature range at which quench hardening is possible (at least the $Ac_3$ point). A water cooling mechanism 6 rapidly cools the steel tube 1 immediately downstream of the induction heating coil 5. As a result, a high temperature portion 1a which moves in the axial direction of the steel tube 1 is locally formed in the steel tube 1 between the induction heating coil 5 and the water cooling mechanism 6. The resistance to deformation of the high temperature portion 1a is markedly lower than the resistance to deformation of other portions.

A movable roller die 4 has at least one set of roll pairs 4a. The roll pairs 4a support the steel tube 1 while feeding it. The movable roller die 4 moves two-dimensionally or three-dimensionally in a region downstream of the water cooling apparatus 6 while supporting the steel tube 1 to apply a bending moment to the high temperature portion 1a.

The manufacturing apparatus 0 carries out bending of the steel tube 1 with high operating efficiency by simple steps using comparatively inexpensive components 2-6 to manufacture a bent member 8 having a desired shape and a high strength (such as a tensile strength of at least 780 MPa).

PRIOR ART DOCUMENTS

Patent Documents

Patent Document 1: WO 2006/093006

Non-Patent Documents

Non-Patent Document 1: Jidosha Gijutsu (Journal of Society of Automotive Engineers of Japan), Volume 57, No. 6 (2003), pages 23-28

DISCLOSURE OF INVENTION

In general, when a solid metal member to be heated such as a rod undergoes induction heating by an induction heating coil, in order to uniformly heat the member being heated in the circumferential direction, induction heating is carried out while rotating the member being heated around its central axis. However, in this manufacturing apparatus 0, it is not possible to rotate a steel tube 1 around its central axis due to limitations on the range of movement of the movable roller die 4 which moves downstream of the support mechanism 2. Therefore, the manufacturing apparatus 0 performs induction heating of a steel tube 1 with the induction heating coil 5 while feeding the steel tube 1 in its axial direction without rotating it. As a result, it is difficult to uniformly heat the steel tube 1 in the circumferential direction.

The electric power for heating when performing induction heating is determined by the product of the current (A) flowing in the induction heating coil 5 and the number of turns of the induction heating coil 5, namely, by the ampere-turns (ATurns).

The manufacturing apparatus 0 can process a steel tube 1 with good accuracy. In order to increase the bending accuracy by the manufacturing apparatus 0, the heated width in the axial direction of the steel tube 1 is preferably as narrow as possible. This heated width increases as the number of turns of the induction heating coil increases. Therefore, the number of turns of the induction heating coil 5 is preferably made as small as possible in order to decrease the heated width.

Although the current which can pass through a single induction heating coil 5 depends upon the material and the cross-sectional area of the coil, it is typically a maximum of around 10,000 A. Therefore, when a larger amount of energy is necessary in order to achieve both high productivity and good dimensional accuracy, the induction heating coil must sometimes have 2 or more turns.

FIG. 7 is an explanatory view showing one example of an induction heating coil 5 based on a conventional technical concept. FIG. 7(a) is a perspective view of the induction heating coil 5. FIG. 7(b) is a perspective view which is drawn with an increased spacing in the direction parallel to the axial direction of a steel tube 1 between the body 9-1 of the first turn of the induction heating coil 5 and the body 9-2 of the second turn for easy understanding of the structure of the induction heating coil 5. FIG. 7(c) is an explanatory view showing a projection of the induction heating coil 5 in the axial direction of the steel tube 1, with the solid arrows showing the direction of current in the body 9-1 of the first turn and the dashed arrows showing the direction of current in the body 9-2 of the second turn. FIG. 7(d) is an explanatory view showing an example of the temperature distribution in a numerical analysis simulation of a steel tube 1 heated using the induction heating coil 5.

In order to manufacture a bent member 8 with high dimensional accuracy using the manufacturing apparatus 0, the high temperature portion 1a of the steel tube 1 must be as narrow as possible in the axial direction of the steel tube 1 and must be uniformly formed in the circumferential direction.

Figure 7A:
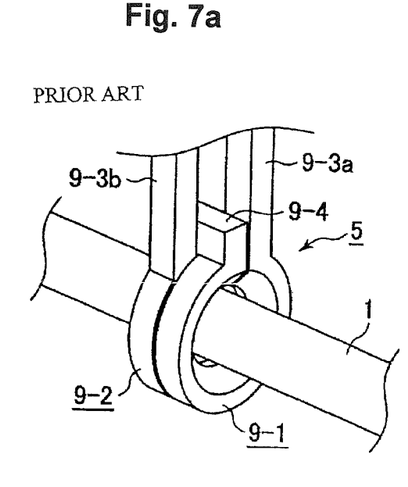
FIG. 7(a) is a perspective view of the induction heating coil.
Figure 7B:
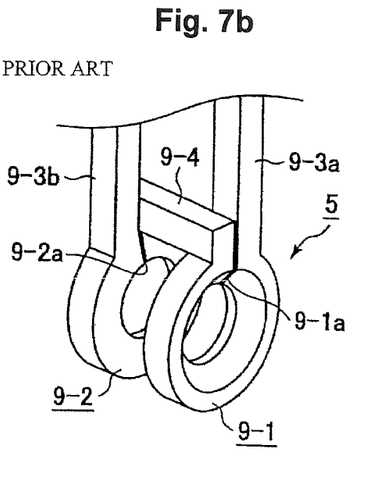
FIG. 7(b) is a perspective view which is drawn with an increased separation in the direction parallel to the axial direction of a steel tube between the body of a first turn and the body of a second turn of an induction heating coil to make it easier to understand the structure of the induction heating coil.
Figure 7C:
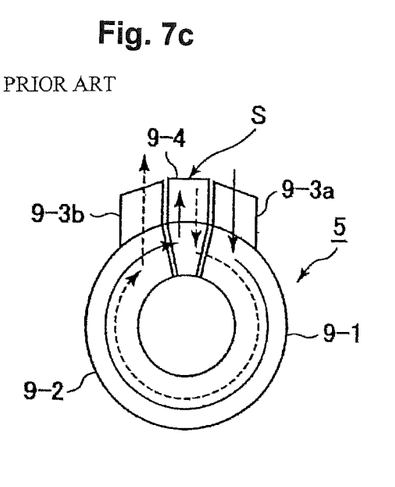
FIG. 7(c) is an explanatory view showing a projection of the induction heating coil in the axial direction of a steel tube.

As shown in FIGS. 7(a)-7(c), the induction heating coil 5 has annular bodies 9-1 and 9-2. The bodies 9-1 and 9-2 are disposed around a steel tube 1 and are separated from the steel tube 1. Body 9-1 has an insulating portion 9-1a which is fanned by inserting an insulating plate therein, and body 9-2 has an insulating portion 9-2a which is formed by inserting an insulating plate therein. As shown in FIG. 7(c), two insulating portions 9-1a and 9-2a are provided between electrodes 9-3a and 9-3b which supply alternating current to the bodies 9-1 and 9-2.

As shown by the solid arrows in FIG. 7(c), an alternating current which is supplied to body 9-1 through one of the electrodes 9-3a flows to the body 9-1. As shown by the dashed arrows in FIG. 7(c), the current which has flowed in body 9-1 sequentially flows through body 9-2 and electrode 9-3b. As a result, a magnetic flux is generated inside the bodies 9-1 and 9-2. Since the current which is flowing is an alternating current, the magnitude and direction of the magnetic flux vary. Therefore, eddy currents are induced in the steel tube 1 so as to generate a magnetic flux which cancels the variation in the magnetic flux. The eddy current produces Joule heat due to the electrical resistance of the steel tube 1, and this causes the steel tube 1 to be heated by induction heating. As a result of the so-called skin effect, the higher the frequency of the supplied alternating current, the more the heat generated by the steel tube 1 is concentrated in the surface layer of the steel tube.

As shown in FIGS. 7(a)-7(c), in order to form the induction heating coil 5 so as to have 2 turns, it is necessary to provide a coil connecting portion 9-4 for connecting the body 9-1 of the first turn and the body 9-2 of the second turn. For this purpose, two insulating portions 9-la and 9-2a each formed from an insulating plate are provided. In general, due to a helical shape of coil, it is common knowledge by those skilled in the art to connect the body 9-1 for the first turn and the body 9-2 for the second turn as close as possible to the member being heated and with a minimum separation.

As shown in FIG. 7(c), in a projection of the induction heating coil 5 in the axial direction of a steel tube 1, current flows in the axial direction of the steel tube 1 in a region S where the coil connecting portion 9-4 is disposed (the region between insulating portions 9-1a and 9-2a). In this region S, the current which flows in the circumferential direction is a single flow in the axial direction of the steel tube, so the induction heating coil 5 essentially has one turn. In contrast, in the remaining regions other than region S, the current flowing in the circumferential direction is double flows in two directions, so the induction heating coil 5 essentially becomes two turns. In this manner, the number of turns of the induction heating coil 5 varies depending on positions in the circumferential direction of the bodies 9-1 and 9-2.

Figure 7D:
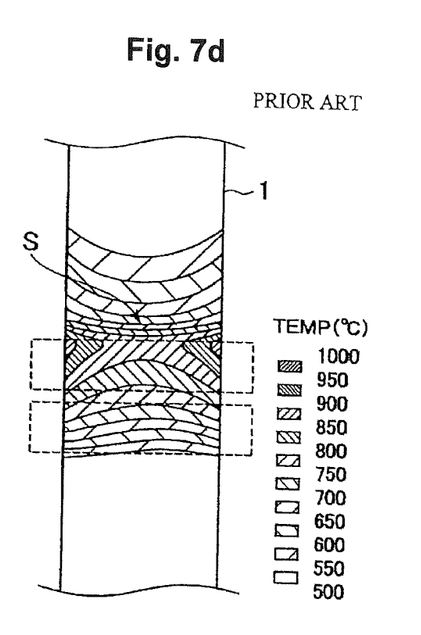
FIG. 7(d) is an explanatory view showing an example of the temperature distribution in a numerical analysis simulation of a steel tube which was heated using the induction heating coil.

Therefore, if the steel tube 1 undergoes induction heating by the induction heating coil 5, a temperature difference unavoidably develops in the circumferential direction of the steel tube 1. For example, when a steel tube 1 made of plain steel and having an outer diameter of 31.8 mm and a wall thickness of 1.8 mm undergoes induction heating by passing through the interior of the induction heating coil 5 at a transport speed of 80 mm/sec in its axial direction without rotating, as shown in FIG. 7(d), the difference between the heating temperature of the steel tube 1 in the portion corresponding to region S where the coil connecting portion 9-4 is disposed (the region between insulating portions 9-1a and 9-2a) and the heating temperature of the steel tube 1 in portions corresponding to the remaining regions other than region S reaches a maximum of approximately 240° C. Thus, the induction heating coil 5 cannot heat the steel tube uniformly in its circumferential direction and in a narrow range in its axial direction in a stable manner.

An object of the present invention is to provide an induction heating coil which can stably heat a metal material such as a steel tube uniformly in its circumferential direction and in a narrow range in its axial direction. Another object of the present invention is to provide an apparatus and method for manufacturing a worked member which can stably and reliably manufacture a worked member having high dimensional accuracy using this induction heating coil.

The structure of an induction heating coil according to the present invention is as shown in FIG. 1. It is an induction heating coil 10 for carrying out induction heating of an elongated metal material 1 while undergoing relative movement with respect to the metal material 1 in the axial direction of the metal material. The induction heating coil 10 comprises (i) a first 1-turn coil body 11 which surrounds the outer periphery of the metal material 1 in the circumferential direction and is spaced from the metal material 1 and which has a first insulating portion 11b and a first electrical conductor, (ii) a second 1-turn coil body 12 which is disposed in parallel with the first 1-turn coil body 11 in the axial direction of the metal material 1 and is spaced from the metal material 1, the second 1-turn coil body 12 having substantially the same inner peripheral shape as the first 1-turn coil body 11 and having a second insulating portion 12b and a second electrical conductor which are, and (iii) a body connecting portion 14 which connects a first adjoining portion 11c which adjoins the first insulating portion 11b in the circumferential direction and a second adjoining portion 12c which adjoins the second insulating portion 12b in the circumferential direction, wherein the relationship between the effective coil length Le and the inner coil length L0 of the induction heating coil satisfies $(L0-Le)/L0 < 0.05$.

The inner coil length L0 means the length of the circumference of the inner surface of the first 1-turn coil body 11 or the second 1-turn coil body 12 (including the insulating portion), and the effective coil length Le is the length along the inner periphery of the overlapping region when the first electrical conductor and the second electrical conductor are projected on a cross section which is perpendicular to the relative direction of movement of the induction heating coil with respect to the metal material 1. Namely, it is the length of the region of the inner periphery in which the effective number of turns in the circumferential direction becomes equal to the number of turns for the entire coil.

For example, the inner coil length is $2\pi R$ for a circular coil with an inner radius R, and it is $2(a+b)$ for a rectangular coil having a short side with a length a on its inner side and a long side with a length b on its inner side. In the example of the present invention shown in FIG. 1, the effective coil length Le is the inner coil length L0 minus the sum (L1+L2) of the lengths L1 and L2 in the circumferential direction of the two insulating portions 11b and 12b. Namely, Le equals to (2 R−L1−L2). The non-effective coil length Ln means the length along the inner periphery of the coil where the effective number of turns having a length in the to circumferential direction is less than the total number of turns for the coil. Namely, Ln=L0−Le.

Accordingly, the present invention is preferably a heating coil for carrying out induction heating of a member being heated in the form of an elongated metal material while undergoing relative movement with respect to the elongated metal material without rotation of the elongated metal material, the heating coil having at least a first 1-turn coil body and a second 1-turn coil body which surround the outer periphery of the elongated metal material in the circumferential direction, characterized in that when the coil is projected in the direction of relative movement with respect to the metal material, Ln/L0 is at most 0.05, wherein Ln is the inner peripheral length of the region of the projected coil in which the effective number of turns is less than the number of turns for the coil as a whole, and L0 is the inner coil length of the projected coil.

In the present invention, the first adjoining portion 11c and the second adjoining portion 12c are preferably located at different positions in the above-described cross section. Specifically, they are preferably at positions separated by a central angle of 5-45° measured from the center of the first 1-turn coil body 11 or the second 1-turn coil body 12.

In an induction heating coil based on a conventional technical concept, it was a common technical knowledge to design in such a manner that the separation between the member being heated and the coil was uniform and such that the overall length of the coil was minimized in order to increase the heating efficiency. However, as shown by FIG. 1, an induction heating coil according to the present invention has a shape which is markedly different from the shape resulting from the common technical knowledge of those skilled in the art. Namely, the present invention was completed by placing the most emphasis on making the number of coil turns uniform in the circumferential direction without regard to an increase in the overall coil length or in the distance (separation) between the coil and a member being heated, and it achieves the unexpected effect that it can uniformly heat the outer periphery of a non-rotating member being heated.

Figure 2:
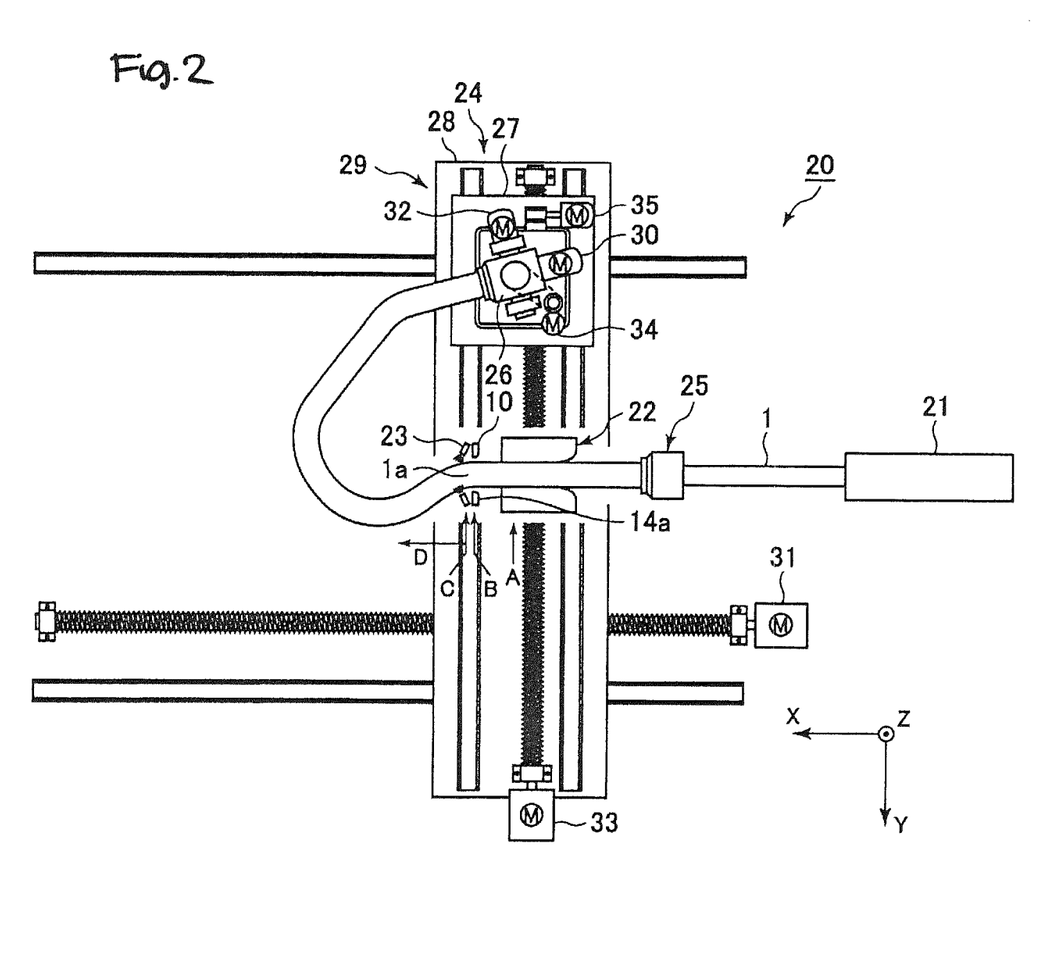
FIG. 2 is an explanatory view schematically showing a manufacturing apparatus for a worked member which employs an induction heating coil according to the present invention.

From another standpoint, as shown in FIG. 2, the present invention is a manufacturing apparatus 20 for a worked member characterized by having an induction heating coil 10, a cooling mechanism 23 for cooling the metal material 1 which underwent induction heating by the induction heating coil 10 while moving together with the induction heating coil 10 relative to the metal material 1, thereby forming a high temperature portion 1a which moves in the axial direction of a metal material 1, and working mechanisms 24 and 29 for applying a bending moment to is the high temperature portion 1a of the metal material.

From another standpoint, as shown in FIG. 2, the present invention is a method of manufacturing a worked member characterized by carrying out induction heating of an elongated metal material 1 which is not rotating around its central axis using an induction heating coil 10 while carrying out relative movement of the induction heating coil 10 in the axial direction of the metal material 1 with respect to the metal material 1, cooling the metal material 1 which underwent induction heating by the induction heating coil 10 with a cooling mechanism 23 which undergoes relative movement with respect to the metal material 1 together with the induction heating coil 10, thereby forming in the metal material 1a high temperature portion 1a which moves in the axial direction of the metal material 1, and then applying a bending moment to the high temperature portion 1a of the metal material.

In the present invention, the metal material 1 is preferably a hollow steel material having a closed transverse cross-sectional shape such as a steel tube.

According to the present invention, it becomes possible to stably heat a metal material uniformly in the circumferential direction and in a narrow region in the lengthwise direction, so a worked member can be stably and reliably manufactured with a high dimensional accuracy.

BRIEF EXPLANATION OF THE DRAWINGS

FIG. 1 is an explanatory view showing an example of an induction heating coil according to the present invention, wherein

FIGS. 3(a) and 3(b) are explanatory views showing the positional relationship between an induction heating coil according to the present invention and a steel tube, wherein FIG. 3(a) shows the case in which the separation between a first 1-turn coil body and a second 1-turn coil body and a steel pipe is a uniform value of 2.0 mm, and FIG. 3(b) shows the case in which the separation between a steel tube and the insulating portions of a first 1-turn coil body and a second 1-turn coil body is 2.0 mm, and the separation between the steel tube and the induction heating coil in locations other than the insulating portions is a non-uniform value in the range of 2.0-4.0 mm.

FIG. 7 is an explanatory view showing an example of an induction heating coil based on a conventional technical concept, in which

EXPLANATION OF SYMBOLS 0 bending apparatus
1 steel tube
2 support mechanism
3 feed mechanism
4 movable roller die
4a roll pair
5 induction heating coil
6 water cooling mechanism
8 bent member
9-1 body of first turn
9-2 body of second turn
9-1a, 9-2a insulating portions
9-3a, 9-3b electrodes
9-4 coil connecting portion
10 induction heating coil according to the present invention
11 first 1-turn coil body
11b first insulating portion
11c first adjoining portion
12 second 1-turn coil body
12b second insulating portion
12c second adjoining portion
13a, 13c electrodes
14 body connecting portion
20 manufacturing apparatus according to the present invention
21 feed mechanism
22 support mechanism
23 cooling mechanism
24 gripping mechanism
25 chuck mechanism
26 body
27 first base
28 second base
29 moving mechanism

MODES FOR CARRYING OUT THE INVENTION

In the following explanation, an example will be given of the case in which a metal material in the present invention is a steel tube. A metal material in the present invention is not limited to a steel tube. The present invention is applied to a hollow metal member having a closed transverse cross-sectional shape. Examples of this hollow member are a hollow metal material having a transverse cross-sectional shape which is rectangular, elliptical, oblong, polygonal, or a combination of a polygon and a circle, or one having a transverse cross-sectional shape which is a combination of a polygon and an ellipse.

[Induction Heating Coil 10]

FIG. 1 is an explanatory view showing an example of an induction heating coil according to the present invention. FIG. 1(a) is a perspective view of an induction heating coil 10, FIG. 1(b) is a perspective view which is drawn with the spacing between a first 1-turn coil body 11 and a second 1-turn coil body 12 of the induction heating coil 10 in the direction parallel to the axial direction of a steel tube 1 being increased in order to make it easier to understand the structure of the induction heating coil 10, FIG. 1(c) is an explanatory view showing a projection of the induction heating coil 10 in the axial direction of the steel tube 1, and FIG. 1(d) is an explanatory view showing an example of the temperature distribution in a numerical analysis simulation of a steel tube 1 which was heated using the induction heating coil 10. In the explanatory notes in FIG. 1(d), the uppermost pattern indicates a temperature from higher than 950° C. up to 1000° C., the second pattern from the top indicates a temperature from higher than 900° C. up to 950° C., and so forth, and the bottom pattern indicates a temperature of not higher than 550° C.

The induction heating coil 10 performs induction heating of a steel tube 1 while undergoing relative movement with respect to the steel tube 1 in the axial direction of the steel tube 1.

The induction heating coil 10 has a first 1-turn coil body 11 and a second 1-turn coil body 12. This is substantially the same as the induction heating coil 10 which has a 1-turn first heating coil 11 and a 1-turn second heating coil 12.

The elongated steel tube 1 is fed in its axial direction without rotating about its central axis.

The first 1-turn coil body 11 is made of a copper alloy and has an annular outer shape. The first 1-turn coil body 11 comprises a first electrical conductor, and a first insulating portion 11b on a portion of its circumference. The first insulating portion 11b is preferably thin. An example of the thickness of the first insulating portion 11b is around 1-2 mm in order to guarantee insulating properties with certainty. The first 1-turn coil body 11 is disposed so as to surround the entire periphery of the steel tube 1 with a predetermined separation from the periphery of the steel tube 1.

An electrode 13a is provided on a first adjoining portion 11c of the first electrical conductor in a position next to the first insulating portion 11b. Alternating current which is supplied to the first 1-turn coil body 11 from the electrode 13a travels around the first electrical conductor of the first 1-turn coil body 11 and then flows into a second electrical conductor of the second 1-turn coil body 12 through a below-described body connecting portion 14. As a result, a magnetic flux is generated inside the first 1-turn coil body 11. Because the flowing current is an alternating current, the magnitude and direction of the magnetic flux vary, and an eddy current is induced in the steel tube 1 so as to generate a magnetic flux which cancels the variations in this magnetic flux. The eddy current produces joule heat due to the electrical resistance of the steel tube 1, and induction heating which heats the steel tube 1 takes place.

The second 1-turn coil body 12 is made of a copper alloy and has an annular outer shape. The second 1-turn coil body 12 has a second electrical conductor, and a second insulating portion 12b in a portion of its circumference. The thickness of the second insulating portion 12b is preferably thin An example of the thickness of the second insulating portion 12b so as to guarantee the insulating properties with certainty is around 1-2 mm. The second 1-turn coil body 12 is disposed so as to surround the entire periphery of the steel tube 1 with a predetermined separation from the periphery of the steel tube 1. The second 1-turn coil body 12 is disposed in parallel with the first 1-turn coil body 11 in the axial direction of the steel tube 1.

The second 1-turn coil body 12 has the same inner peripheral shape as the first 1-turn coil body 11. The second 1-turn coil body 12 also has the same outer peripheral shape as the first 1-winding coil body 11.

An electrode 13c is provided on a second adjoining portion 12c of the second electrical conductor which adjoins the second insulating portion 12b. Alternating current which is supplied from the below-described body connecting portion 14 to the second electrical conductor of the second 1-turn coil body 12 flows around the second electrical conductor of the second 1-turn coil body 12 and then flows into electrode 13c. As a result, a magnetic flux is generated inside the second 1-turn coil body 12. Due to the flowing current which is an alternating current, the magnitude and direction of the magnetic flux vary, and an eddy current is induced in the steel tube 1 so as to generate a magnetic flux which cancels the variations in the magnetic flux. The eddy current generates joule heat due to the electrical resistance of the steel tube 1, and the steel tube 1 is heated by induction heating.

The body connecting portion 14 connects the first adjoining portion 11c which adjoins the first insulating portion 11b in the circumferential direction and the second adjoining portion 12c which adjoins the second insulating portion 12b in the circumferential direction.

Figure 1A:
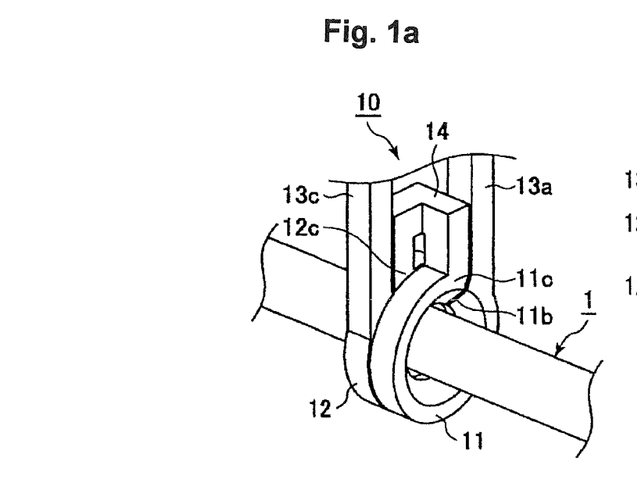
FIG. 1(a) is a perspective view of the induction heating coil.
Figure 1B:
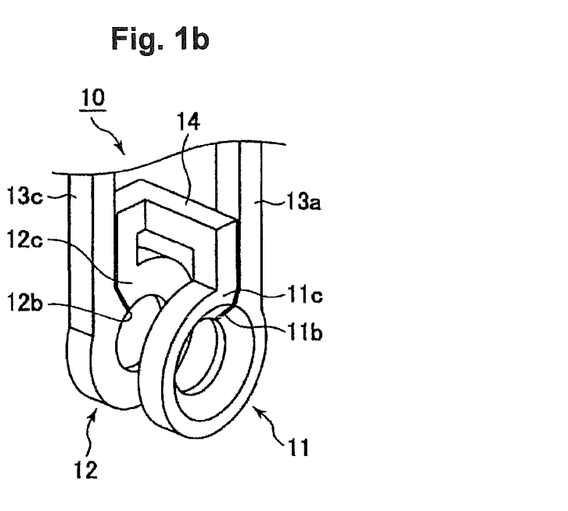
FIG. 1(b) is a perspective view in which the spacing in the direction parallel to the axial direction of a steel pipe between a first 1-turn coil body and a second 1-turn coil body of the induction heating coil is increased to make it easier to understand the structure of the induction heating coil.

As stated below, the first adjoining portion 11c and the second adjoining portion 12c are located at different positions in a cross section which is perpendicular to the direction of relative movement of the induction heating coil 10 with respect to the steel tube 1 and which is projected in the axial direction of the steel tube 1 (below, this cross section will be referred to for short in this description as the projected transverse cross section). Therefore, as shown in FIGS. 1(a) and 1(b), the body connecting portion 14 has a cross-sectional shape which is bent at 90° into roughly the shape of the letter L.

The body connecting portion 14 supplies alternating current which flows from the first adjoining portion 11 c of the first 1-turn coil body 11 to the second 1-turn coil body 12 through the second adjoining portion 12c of the second 1-turn coil body.

Figure 1C:
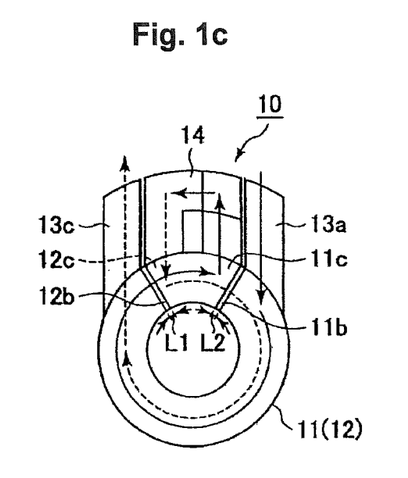
FIG. 1(c) is an explanatory view showing a projection of the induction heating coil in the axial direction of the steel tube.

As shown in FIG. 1(c), in the induction heating coil 10, the non-effective coil length Ln which is the length of the region where the effective number of coil turns in the circumferential direction is less than the total number of the coil turns is the total length (L1+L2) of the width L2 of the second insulating portion 12b and the width L1 of the first insulating portion 11b. The non-effective coil length Ln is at most 5% of the inner coil length L0. Preferably, Ln≤0.03× L0.

As shown in FIG. 1(c), in the induction heating coil 10, the first adjoining portion 11c and the second adjoining portion 12c are at different locations in a projected transverse cross section. Specifically, they are preferably separated by a central angle of 5-45° measured from the center of the first 1-turn coil body 11 or the second 1-turn coil body 12.

In the high frequency induction heating coil 5 shown in FIG. 7(c) according to a conventional technical concept, the non-effective coil length where the effective number of coil turns is 1 is the combined length of the insulating portions 9-1a and 9-2a plus the length of the region S where the coil connecting portion 9-4 is disposed (i.e., the region between the insulating portions 9-1a and 9-2a). This width is a large value which is around the same as the coil width. In contrast, in the induction heating coil 10 according to the present invention shown in FIG. 1(c), the region where the effective number of coil turns is 1 is only the region where the first insulating portion 11b is present and the region where the second insulating portion 12b is present. Therefore, the region in which current flows only through one turn in the circumferential direction is greatly decreased.

For example, in the case in which the thickness of each of the first insulating portion 11b and the second insulating portion 12b is 2 mm, if the diameter of the steel pipe 1 is 31.8 mm and the inner diameter of the first 1-turn coil body 11 and the second 1-turn coil body 12 is 37.8 mm, the total length (L1+L2) of the width L1 of the second insulating portion 12b and the width L2 of the first insulating portion 11b becomes approximately 3.4% of the inner coil length of the first 1-turn coil body 11 or the second 1-turn coil body 12, which is 118.75 mm.

If the diameter of the steel tube 1 is 25.4 mm and the inner diameter of the first 1-turn coil body 11 or the second 1-turn coil body 12 is 31.4 mm, the total length (L1+L2) becomes approximately 4.1% of the inner coil length of the first 1-turn coil body 11 or the second 1-turn coil body 12.

In the induction heating coil 5 based on the conventional technical concept, the non-effective coil length is nearly the same as the coil width. When the inner diameter of the body 9.1 of the first turn is 31.4 mm and the coil width is 15 mm, the non-effective coil length is approximately 15% of the inner coil length.

Figure 1D:
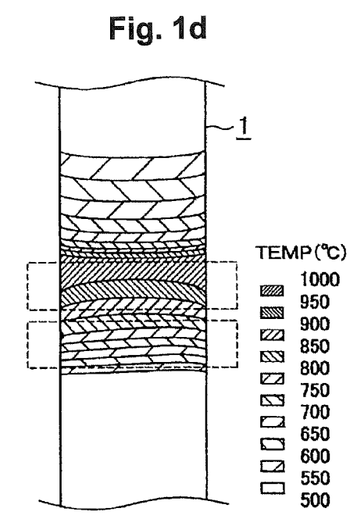
FIG. 1(d) is an explanatory view showing an example of the temperature distribution in a numerical analysis simulation of a steel tube which was heated using the induction heating coil.

As can be seen by comparing FIG. 1(d) and FIG. 7(d), if a steel tube 1 undergoes induction heating using an induction heating coil 10 according to the present invention, the temperature difference in the circumferential direction of the steel tube 1 is markedly decreased compared to when induction heating of the steel tube 1 is carried out using an induction heating coil 5 based on a conventional technical concept. For example, a steel tube 1 of plain steel having an outer diameter of 31.8 mm and a wall thickness of 1.8 mm undergoes induction heating by passing through the interior of the induction heating coil 10 or induction heating coil 5 while being transported in its axial direction at a transport speed of 80 mm/sec without rotating. In this case, the temperature difference in the circumferential direction produced in the steel tube 1 is approximately 240° C. with the induction heating coil 5, but it is reduced to approximately 80° C. with the induction heating coil 10. In this manner, the induction heating coil 10 can stably heat a steel tube 1 uniformly in its circumferential direction and in a narrow range.

The above explanation took as an example a configuration in which the induction heating coil 10 has two 1-turn coil bodies 11 and 12. The present invention is not limited to this configuration. An induction heating coil according to the present invention may have 3 or more 1-turn coil bodies. A third 1-turn coil body can be disposed in parallel with the first 1-turn coil body 11 and the second 1-turn coil body 12 between the first 1-turn coil body 11 and the second 1-turn coil body 12 or next to the first 1-turn coil body 11 or the second 1-turn coil body 12. For reasons such as reducing the heated width and reducing the installation space, the number of 1-turn coil bodies is preferably 2 or 3.

The shape of the induction heating coil is not limited to a circle, and it may have a transverse cross-sectional shape which is a rectangle, an ellipse, an oblong, a polygon, or a combination of a polygon and a circle, or it may have a transverse cross-sectional shape which is a combination of a polygon and an ellipse.

[Manufacturing Apparatus 20 and Manufacturing Method]

Application of the induction heating coil 10 to the bending apparatus 0 and the state when manufacturing a worked member will be explained.

FIG. 2 is an explanatory view schematically showing a manufacturing apparatus 20 for a worked member to which an induction heating coil 10 according to the present invention is applied.

As shown in this figure, the manufacturing apparatus 20 has a feed mechanism 21, a support mechanism 22, an induction heating coil 10, a cooling mechanism 23, and a gripping mechanism 24. These components will be explained in sequence.

[Feed Mechanism 21]

The feed mechanism 21 feeds a steel tube 1 in its lengthwise direction.

A mechanism using an electric servo cylinder is shown as an example of the feed mechanism 21. The feed mechanism 21 is not limited to a particular type of mechanism. For example, a known mechanism such as one using a ball screw or one using a timing belt or chain can be used equally well as this type of feed mechanism for the steel tube 1.

The steel tube 1 is supported by a chuck mechanism 25 so as to be able to move. The feed mechanism 21 feeds the steel tube 1 in its axial direction (lengthwise direction) at a predetermined feed speed. The chuck mechanism 25 supports the steel pipe 1 so as to feed the steel tube 1. The chuck mechanism 25 may be omitted when the below-described support mechanism 22 is provided.

In the manufacturing apparatus 20, the feed mechanism 21 feeds the steel tube 1 in its axial direction, and the induction heating coil 10 and the cooling mechanism 23 are fixed in place. However, the present invention is not limited to this configuration. The induction heating coil 10 and the cooling mechanism 23 may be disposed so as to move relative to the steel tube 1. For example, it is to possible for (a) the steel tube 1 to be fixed in place without being fed and for the induction heating coil 10 and the cooling mechanism 23 to move with respect to the steel tube 1, or for (b) the steel tube 1 to be fed in its axial direction and for the induction heating coil 10 and the cooling mechanism 23 to move with respect to the steel tube 1.

[Support Mechanism 22]

The support mechanism 22 supports the steel tube 1 which is being fed in its axial direction by the feed mechanism 21 at a first position A so as to be able to move.

A fixed guide is given as an example of the support mechanism 22. The support mechanism 22 is not limited to a particular type of mechanism. For example, one or more pairs of opposing non-driven rolls may be used as the support mechanism 22. Any known support mechanism may be used equally well as the support mechanism 22.

The steel tube 1 passes the installation position A of the support mechanism and is fed in its axial direction. The support mechanism 22 may be replaced by the chuck mechanism 25.

[Induction Heating Coil 10]

The induction heating coil 10 rapidly heats the steel tube 1 at a second position B located downstream of the first position A in the feed direction of the steel tube 1.

At the second position B, the induction heating coil 10 performs induction heating of the steel tube 1 which is being fed at a feed speed of 5-150 mm/sec by supplying an alternating current with a frequency of 5-100 kHz to the first 1-turn coil body 11 and the second 1-turn coil body 12.

By varying the distance between the induction heating coil 10 and the steel tube 1 in the directions perpendicular to and parallel to the axial direction of the steel tube 1, a portion of the steel tube 1 can be non-uniformly heated in its circumferential direction.

Figure 3A:
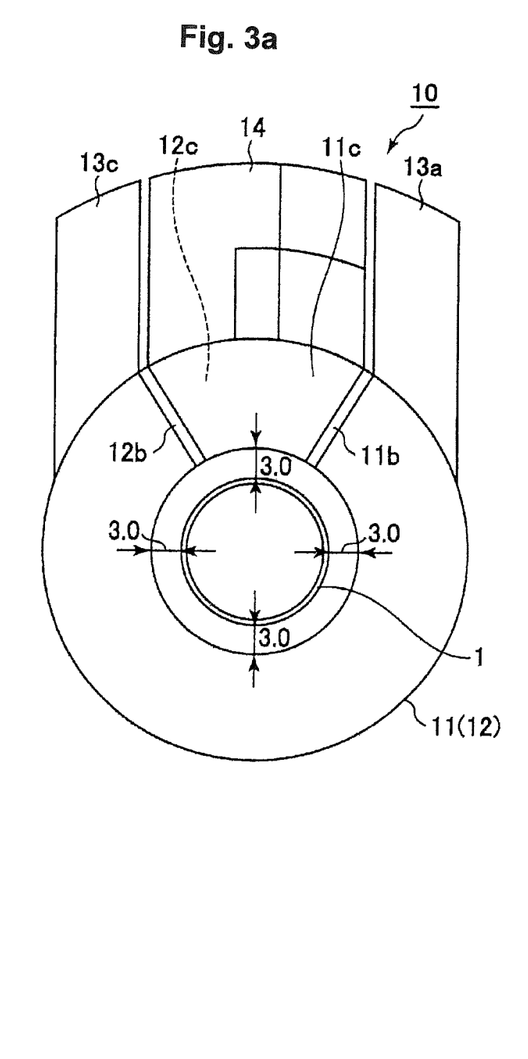
Figure 3B:
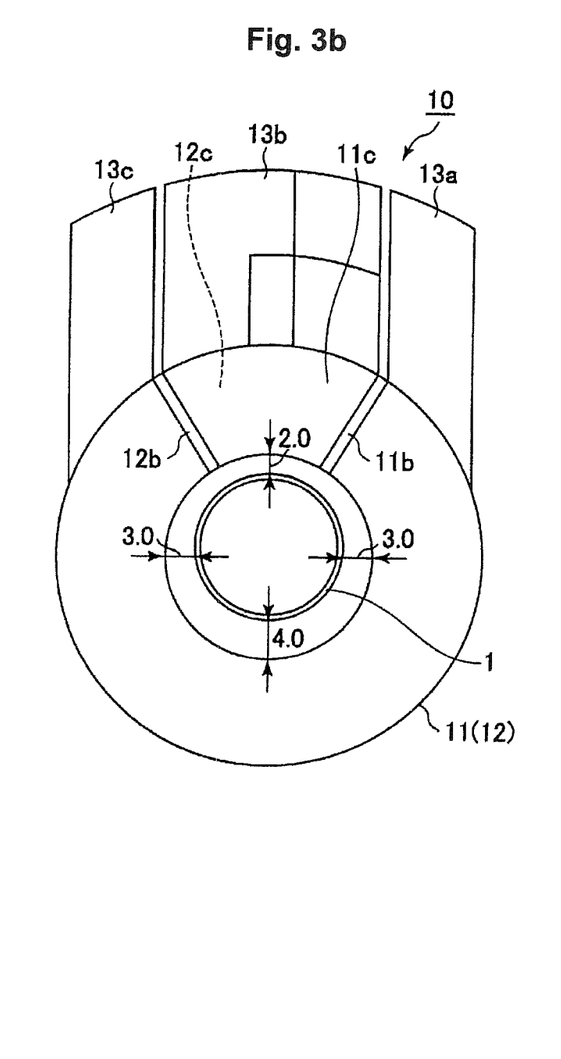

FIG. 3(a) and FIG. 3(b) are explanatory views showing the positional relationship between the induction heating coil 10 and the steel tube 1. FIG. 3(a) shows the case in which the separation of the first 1-turn coil body 11 and the second 1-turn coil body 12 from the steel tube 1 is a uniform value of 3.0 mm, and FIG. 3(b) shows the case in which the separation of the insulating portion 11b of the first 1-turn coil body 11 and the insulating portion 12b of the second 1-turn coil body 12 from the steel tube 1 is 2.0 mm while the separation between the induction heating coil 10 and the steel tube 1 in locations other than the first insulating portion 11b and the second insulating portion 12b is a non-uniform value in the range of 2.0-4.0 mm.

In the case shown in FIG. 3(a), the temperature of the steel tube 1 in the vicinity of the first insulating portion 11b and the second insulating portion 12b is lower than the temperature of the steel tube 1 in other locations, and the temperature difference in the circumferential direction of the steel tube 1 is around 80° C.

In contrast, in the case shown in FIG. 3(b), the difference between the temperature of the steel tube 1 in the vicinity of the first insulating portion 11b and the second insulating portion 12b and the temperature of the steel pipe 1 in other portions is reduced, and the temperature difference in the circumferential direction of the steel tube 1 is around 40° C.

By also providing at least one preheating means for the steel tube 1 on the upstream side of the induction heating coil 10, the steel tube 1 can be heated a plurality of times. As a result, the temperature difference in the circumferential direction of the steel tube 1 can be decreased.

Furthermore, by providing at least one preheating means for the steel tube 1 on the upstream side of the induction heating coil 10, the steel tube 1 being fed can be non-uniformly heated in its circumferential or axial direction. As a result, the temperature difference in the circumferential direction of the steel tube 1 can be further decreased.

As shown in FIG. 1(d), a steel tube 1 can be rapidly heated by the induction heating coil 10 while markedly decreasing the temperature difference in s the circumferential direction.

[Cooling Mechanism 23]

The cooling mechanism 23 is disposed at a third position C downstream of the second position B in the feed direction of the steel tube 1. The cooling mechanism 23 cools the heated steel tube 1. Cooling the steel tube 1 with the to cooling mechanism 23 locally forms a high temperature portion 1a which moves in the axial direction of the steel tube 1. The high temperature portion 1a has a greatly reduced resistance to deformation compared to other portions.

The cooling mechanism 23 can be any mechanism which can cool the steel tube 1 at a desired cooling speed and is not limited to a particular type of cooling mechanism. In general, an example of the cooling mechanism 23 is a water cooling mechanism which cools the steel tube 1 by spraying cooling water at a predetermined position on the outer surface of the steel tube 1.

As shown in FIG. 2, cooling water is sprayed so as to be sloped in the feed direction of the steel tube 1. By varying the distance of the cooling mechanism 23 with respect to the steel tube 1 in a direction parallel to the direction perpendicular to the axial direction of the steel tube 1, the length of the high temperature portion 1a in the axial direction can be adjusted.

[Gripping Mechanism 24]

The gripping mechanism 24 is disposed in a region D downstream of the third position C in the feed direction of the steel tube 1. The gripping mechanism 24 moves three-dimensionally in a workspace including a space upstream of the third position C in the feed direction of the steel tube 1 while gripping the steel tube 1. As a result, the gripping mechanism 24 applies a bending moment to the high temperature portion 1a fainted in the steel tube 1. In general, a chuck mechanism is used as the gripping mechanism 24.

In the present invention, the gripping mechanism 24 which can move three-dimensionally can of course move two-dimensionally. By moving the gripping mechanism 24 two-dimensionally, it is possible to carry out bending in which the bending direction varies two-dimensionally and to manufacture a bent member such as an S-shaped bent member in which the bending direction varies two-dimensionally.

The workspace means a three-dimensional space prescribed by Equations (1), (2), and (3).

$$x<0 \text{ and}(y=0 \text{ or } y>0.5 \text{ D})\text{and } 0<\theta<360° \quad (1)$$

$$x^2+(y-R_{min})^2>R_{min}^2 \quad (2)$$

$$x^2+(y+R_{min})^2>R_{min}^2-(0.5D-R_{min})^2+(0.5 \text{ D}+R_{min})^2 \quad (3)$$

In Equations (1)-(3), D means the smallest outer dimension (mm) of a bent member, $R_{min}$ means the smallest bending radius (mm) of the bent member, and x, y, and θ are cylindrical coordinates having the second position as an origin. The instantaneous feed direction of the bent member is the positive x direction, the direction perpendicular to x in a horizontal plane is the y direction, and the angle in is the circumferential direction is θ.

Bending of the steel tube 1 is carried out by moving the gripping mechanism 24 three-dimensionally within the workspace. As a result, a bent member intermittently or continuously having a bend in its lengthwise direction is manufactured.

The workspace is a notionally defined space, and objects such as various mechanisms may be present inside the workspace.

The gripping mechanism 24 has a body 26 with a pillar-like outer shape and a moving mechanism 29.

The body 26 is constituted by a hollow member. The hollow member has an inner peripheral surface with a shape fitting the outer peripheral surface of the steel tube 1. The body 26 grips the steel tube 1 by contacting the outer surface of the end of the steel tube 1.

In contrast to the example shown in FIG. 2, the body 26 may be constituted by a tubular member having an outer peripheral surface with a shape matching the inner peripheral surface of the steel tube 1. In this case, the steel tube 1 is gripped by inserting the body 26 into the end of the steel tube 1.

The moving mechanism 29 is constituted by a first base 27 and a second base 28. The first base 27 is to mount the body 26 thereon and is movable in a direction perpendicular to the feed direction of the steel tube 1 at the first position A (in the vertical direction in FIG. 2). The second base 28 having the first base 27 thereon is movable in the above-described feed direction.

Each of movement of the first base 27 and movement of the second base 28 is carried out using a ball screw and a drive motor. The body 26 is movable two-dimensionally in a horizontal plane by this moving mechanism 29. Reference number 30 in FIG. 2 indicates an x axis tilt motor, reference number 31 indicates an x axis shift motor, reference number 32 indicates a y axis tilt motor, reference number 33 indicates a y axis shift motor, reference number 34 indicates a z axis tilt motor, and reference number 35 indicates a z axis shift motor.

Instead of the moving mechanism 29 shown in FIG. 2, an articulated robot having rotatable joints which can rotate about at least one axis can support the body 26. Using an articulated robot makes it easy to support the body 26 so as to move three-dimensionally.

The state when manufacturing a worked product having a bent portion which is bent three-dimensionally intermittently or continuously in its lengthwise direction using the manufacturing apparatus 20 will be explained.

An elongated steel tube 1 having a closed transverse cross-sectional shape is supported at the first position A by the support mechanism 22 and is fed in its lengthwise direction by the feed mechanism 21.

At the second position B, an alternating current at a frequency of 5-100 kHz is supplied to the induction heating coil to carry out induction heating of the steel tube 1 which is being fed at a feed speed of 5-150 mm/sec.

At the third position C, the steel tube 1 is cooled with the cooling mechanism 23, thereby forming a high temperature portion 1a in the steel tube 1.

Furthermore, in region D, the position of the gripping mechanism 24 is varied three-dimensionally within a workspace including a space upstream of the third position C in the feed direction of the steel tube 1 to apply a bending moment to the high temperature portion 1a of the steel tube 1, and this procedure is carried out sequentially in accordance with the target shape of a product.

As a result, a bent product having a three-dimensionally bent portion intermittently or continuously in its lengthwise direction is continuously manufactured.

By locally heating the steel tube 1 at the second position B to a temperature at which quench hardening is possible and performing cooling at a predetermined cooling speed at the third position C, all or a portion of the steel tube 1 can be hardened. As a result, a bent product has an intermittent or continuous hardened portion at least in its lengthwise direction and/or in the outer peripheral direction in a cross section crossing the lengthwise direction.

It is possible to continuously manufacture a bent product by (a) disposing the manufacturing apparatus 20 on the exit side of a post-treatment unit in a continuous bent product manufacturing apparatus which constitutes an electro-seamed steel tube manufacturing line and which comprises an uncoiler for continuously paying out a steel strip, a forming unit for forming the paid-out steel strip into a tube having a predetermined cross-sectional shape, a welding unit for welding the abutting side edges of the steel strip to form a continuous tube, and the post-treatment unit for cutting off the weld bead and if necessary performing post-annealing or sizing, or (b) disposing the manufacturing apparatus 20 on the exit side of a forming mechanism in a continuous bent product manufacturing apparatus which constitutes a roll forming line and which comprises an uncoiler for continuously paying out a steel strip and the forming mechanism for forming the paid-out steel strip into a predetermined cross-sectional shape.

According to the present invention, even when manufacturing a bent product by bending in which the bending direction varies three-dimensionally, and even when it is necessary to bend a metal material having a high strength, it is possible to stably form a heated region which is uniform in the circumferential direction of a heat member in the form of a metal material and which extends over a narrow region in the axial direction of the metal material.

As a result, it is possible to efficiently and inexpensively manufacture a bent product which has a high strength, good shape retention, a predetermined hardness distribution, and a desired dimensional accuracy and which does not have a constant radius of curvature in its lengthwise direction but which has at least two portions of a different radius of curvature from each other in its lengthwise direction.

Moreover, by carrying out bending of a metal material while gripping the metal material with a gripping means which is supported by an articulated robot or the like, it is possible to perform bending at a large bending angle with good bending accuracy and excellent operating efficiency while suppressing worsening of the surface condition or surface flaws.

The present invention can be widely employed as a bending means for bent products for automobiles, for example, for which requirement of bending is further increased.

A quench-hardened steel material which is manufactured by the present invention can be used in the below-listed applications (i)-(vii), for example.

(i) Strength members for automobiles such as lower aims of automobile suspensions or brake pedals.

(ii) Reinforcing members for automobiles such as various types of reinforcement and braces.

(iii) Structural members of automobiles such as bumpers, door impact beams, side members, suspension mount members, pillars, and side sills.

(iv) Frames or cranks for automobiles, motorcycles, or the like.

(v) Reinforcing members for trains such as electric cars, and bogie parts (bogie frames, various beams, and the like).

(vi) Frame components and reinforcing members for ship hulls.

(vii) Strength members, reinforcing members, or structural members of household electrical appliances.

EXAMPLE

Using a manufacturing apparatus in which the induction heating coil 10 shown in FIG. 1 was applied to the manufacturing apparatus 0 shown in FIG. 6 and a manufacturing apparatus in which the comparative example of an induction heating coil 5 shown in FIG. 7 was applied to the manufacturing apparatus 0 shown in FIG. 6, induction heating was carried out on a steel tube 1 of plain steel having an outer diameter of 31.8 mm and a wall thickness of 1.8 mm while feeding the steel tube 1 in its axial direction without rotation at a feed speed of 80 mm/sec by passing it through the interior of induction heating coil 10 or 5. A plurality of thermocouples were mounted at two locations P1 and P2 in the circumferential direction of the steel tube 1, and the temperature of the steel tube 1 during heating was measured while feeding the steel tube 1.

Figure 4:
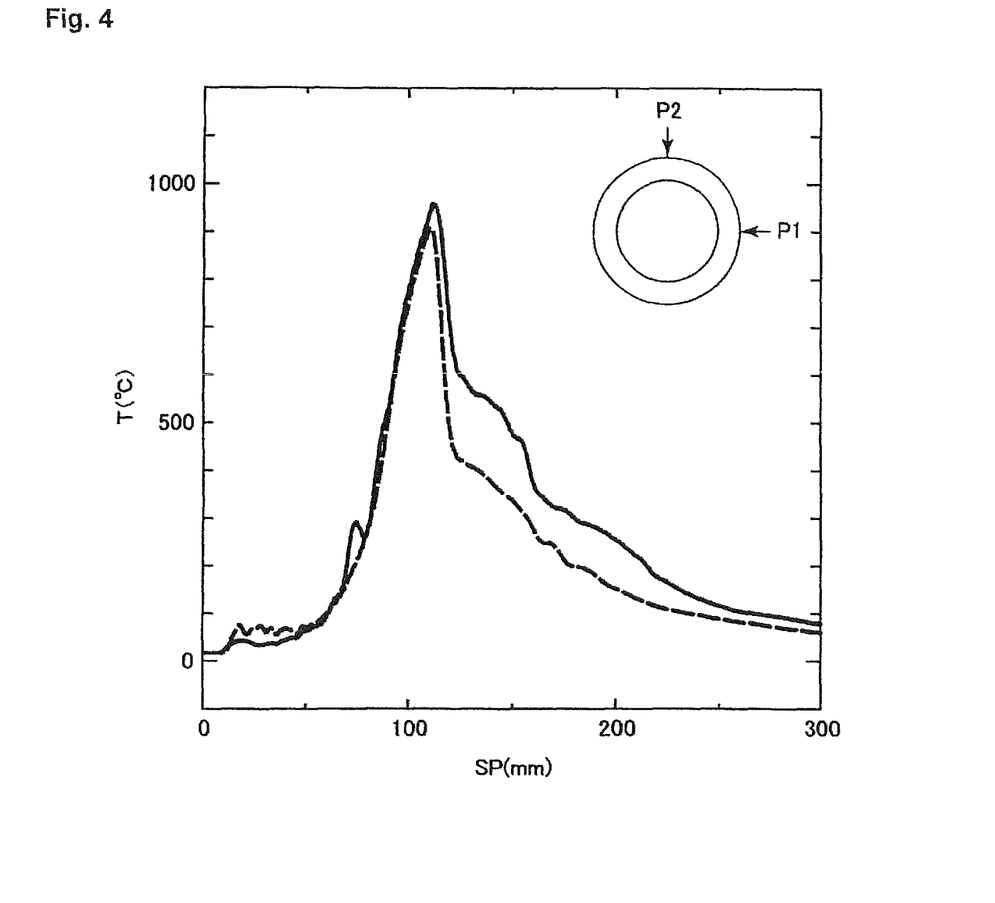
FIG. 4 is a graph showing the temperature distribution in the axial direction when a steel tube is heated by an induction heating coil according to the present invention.
Figure 5:
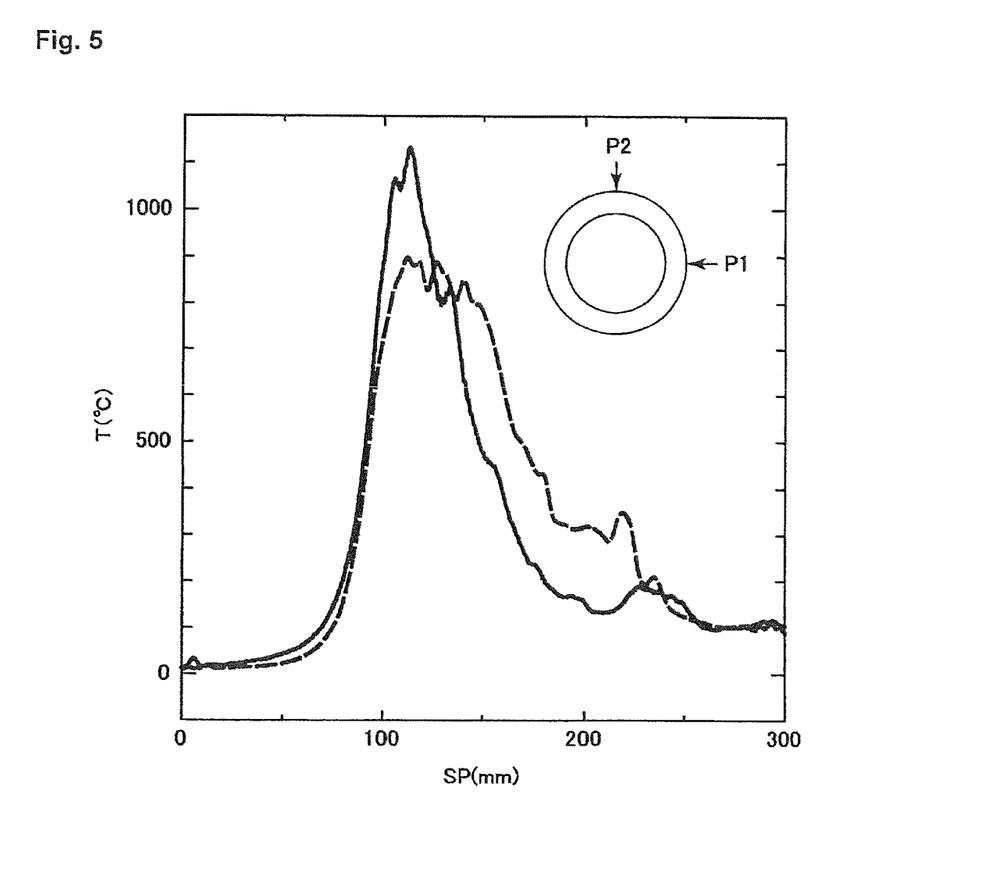
FIG. 5 is a graph showing the temperature distribution in the axial direction when a steel tube is heated by a comparative example of an induction heating coil.

FIG. 4 is a graph showing the results for the example of the present invention, and FIG. 5 is a graph showing the results for the comparative example.

The measurement positions were positions P1 and P2 shown in the graphs in FIGS. 4 and 5. Position P1 was a position in a region disposed between the first insulating portion 11b and the second insulating portion 12b in a transverse cross section. Namely, in the comparative example of an induction heating coil 5, it was at a position where the effective number of coil turns was 1. Position P2 was a position spaced by a central angle of 90° from position P1 measured from the center of the body 11. The solid lines in the graphs of FIGS. 4 and 5 show the results of measurement at position P1, and the dashed lines show the results of measurement at position P2.

The ordinate T in the graphs of FIGS. 4 and 5 shows the temperature (° C.) of the steel tube 1, and the abscissa SP shows the feed position (mm) in the axial direction of the steel tube 1.

As shown in the graph of FIG. 5, the temperature difference in the circumferential direction of the steel tube in the comparative example was approximately 260° C., while as shown in the graph of FIG. 4, in the example of the present invention, the temperature difference in the circumferential direction of the steel tube 1 was reduced to approximately 80° C.

The invention claimed is:

1. A method of manufacturing a worked member comprising:

moving an elongated metal material in a direction of an axis relative to an induction heating coil without rotating about the axis;

heating with the induction heating coil while moving the elongated metal material;

cooling the elongated metal material heated by the induction heating coil and forming a high temperature portion in the elongated metal material while moving the elongated metal material; and applying a bending moment to the high temperature portion while moving the elongated metal material, wherein the induction heating coil comprises:

a first 1-turn coil body surrounding an outer periphery of the elongated metal material in a circumferential direction;

a second 1-turn coil body being disposed in parallel with the first 1-turn coil body in the axial direction of the elongated metal material; and a body connecting portion connecting a first adjoining portion which adjoins a first electrically insulating portion in the circumferential direction and a second adjoining portion which adjoins a second electrically insulating portion in the circumferential direction, wherein the first 1-turn coil body being spaced from the elongated metal material;

the first 1-turn coil body having the first electrically insulating portion and a first electrical conductor;

the second 1-turn coil body being spaced from the elongated metal material;

the second 1-turn coil body substantially having the same shape and same size as the first 1-turn coil body;

the second 1-turn coil body having the second electrically insulating portion and a second electrical conductor;

the body connecting portion including a bend therein;

the first electrically insulating portion being disposed on a portion of the first 1-turn coil body in the circumferential direction;

the second electrically insulating portion being disposed on a portion of the second 1-turn coil body in the circumferential direction;

Ln/L0 being greater than zero and at most 0.05, when the first adjoining portion and the second adjoining portion are projected in a cross section which is perpendicular to the direction of the axis and when a non-effective coil length is Ln and an inner coil length is L0; and the first electrically insulating portion and the second electrically insulating portion being not overlapped with each other when viewed from the direction of the axis.

* * * * *